(12) United States Patent  
Saito et al.

(10) Patent No.: US 7,155,974 B2  
(45) Date of Patent: Jan. 2, 2007

(54) INERTIA SENSOR UNIT

(75) Inventors: Kazutaka Saito, Kawachi-gun (JP); Akira Nakamuta, Utsunomiya (JP); Ichiro Ueno, Haga-gun (JP); Fumiki Sato, Utsunomiya (JP); Satoshi Hiyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 10/978,785

(22) Filed: Oct. 15, 2004

(65) Prior Publication Data

US 2005/0183501 A1    Aug. 25, 2005

(30) Foreign Application Priority Data

Oct. 20, 2003 (JP) ............................. 2003-359097

(51) Int. Cl.
*G01P 3/00* (2006.01)
*G01P 21/00* (2006.01)
*G01P 15/00* (2006.01)

(52) U.S. Cl. .......................................... 73/497; 73/1.37

(58) Field of Classification Search .............. 73/497, 73/1.37, 1.38
See application file for complete search history.

(56) References Cited

U.S. PATENT DOCUMENTS 4,467,651 A * 8/1984 Peters et al. .................... 73/497
4,487,280 A * 12/1984 Knothe et al. ............... 177/212
4,935,883 A * 6/1990 Hulsing, II ................. 700/302
5,012,676 A * 5/1991 Takahashi et al. ............. 73/497
5,062,584 A * 11/1991 Neff et al. .................. 244/3.15
5,297,028 A * 3/1994 Ishikawa ...................... 702/96
5,365,768 A * 11/1994 Suzuki et al. ................ 73/1.01
7,043,360 B1 * 5/2006 Mitsunaga et al. ......... 701/209

FOREIGN PATENT DOCUMENTS

| EP | 0445778 | * | 9/1991 |
| JP | 9-3111140 | * | 12/1997 |
| JP | 2000-111348 | * | 4/2000 |

* cited by examiner

*Primary Examiner*—Helen Kwok  
(74) *Attorney, Agent, or Firm*—Hamre, Schumann, Mueller & Larson, PC

(57) ABSTRACT

An inertia sensor unit having a detecting element, a signal processor being constituted as an element separate from the detecting element, for at least amplifying signals output from the detecting element, and an inertia sensor mounted to a detection object for detecting acceleration or angular velocity of the detection object as an inertial force of the detection object to output electrical signals changing according to the inertial force, includes: a first temperature detecting element for detecting the temperature of the signal processor, a second temperature detecting element for detecting the temperature of the detecting element directly or indirectly, and a correcting processor for correcting the signals output from the inertia sensor based on the result detected by the first temperature detecting element and the second temperature detecting element.

4 Claims, 6 Drawing Sheets

INERTIA SENSOR UNIT

BACKGROUND OF THE INVENTION

1. Field of the Invention

This invention relates to an inertia sensor unit mounted on vehicles and the like.

Priority is claimed on Japanese Patent Application No. 2003-359097, filed Oct. 20, 2003, the content of which is incorporated herein by reference.

2. Description of Related Art

Conventionally, in observing a position or an orientation of vehicles, a flying object and the like, measurement of angular velocity and acceleration is performed and, for this reason, inertia sensors, such as an angular velocity sensor and an acceleration sensor, are used. It is general to convert the analog electricity signals output from inertia sensors, such as an angular velocity sensor and an acceleration sensor into digital signals corresponding to resolutions as occasion demands, respectively, through an A/D converter.

Moreover, it is also common to correct signals output from an angular velocity sensor and an acceleration sensor with the circumferential temperature around the angular velocity sensor and the acceleration sensor detected by the temperature sensor provided in an ASIC which processes the output signal of a sensor or a sensor unit, because the output of the angular velocity sensor or the acceleration sensor has a temperature dependency. For example, such a sensor is disclosed in the Japanese Patent Application Laid-Open Nos. H09-311140 and 2000-111348.

However, the above traditional sensors have a problem that the signals output from the angular sensor and the acceleration sensor cannot be accurately corrected with the temperature detected by the temperature sensor, because the temperature detected by the temperature sensor may differ depending on the number and arrangement of the temperature sensor, i.e. in the case in which the temperature is elevated by the heat generated by the ASIC and the microcomputer itself which processes the output signal of a sensor, and the case in which the temperature is elevated by the heat from an outer environment, although the accuracy of the output from the sensor is improved compared with the case of doing nothing.

In particular, in an inertia sensor in which a detecting element and a signal-processor for processing the signals output from the detecting element are constituted as individual elements respectively, there was a problem that each output signals could not be corrected accurately with the exact temperature depending on the arrangement place of the temperature sensor, because a difference in temperature occurred between the detecting element and the signal-processor.

SUMMARY OF THE INVENTION

This invention was made in view of the above problems. That is, it is an object of the present invention to provide an inertia sensor unit which is capable of correcting the temperature dependency of the output signals with a high accuracy to detect exact inertial force.

In order to solve the above problem, the inertia sensor unit of the first aspect of the present invention is an inertia sensor unit having a detecting element, a signal processor being constituted as an element separate from said detecting element, for at least amplifying signals output from said detecting element, and an inertia sensor mounted to a detection object for detecting acceleration or angular velocity of the detection object as an inertial force of the detection object to output electrical signals changing according to said inertial force, comprising: a first temperature detecting means for detecting the temperature of the signal processor, a second temperature detecting means for detecting the temperature of the detecting element directly or indirectly, and a correcting means for correcting the signals output from the inertia sensor based on the result detected by the first temperature detecting means and the second temperature detecting means.

The inertia sensor unit equipped with the above constitution can accurately correct the signals output from the inertia sensor, in which a detecting element and signal processor for processing signals output from the detecting element are separate from each other, by the temperature of the signal processor detected by the first temperature detecting means and the temperature of the detecting element detected directly or indirectly by the second temperature detecting means, while using the correcting means. As a result, it is possible to achieve an inertia sensor unit which is capable of correcting the temperature dependency of the signals output from the sensor and of detecting exact inertial force.

An inertia sensor unit of the second aspect of the present invention is an inertia sensor unit as set forth in the above first aspect of the present invention, wherein the correcting means includes: a signal processor correcting means for correcting signals output from the signal processor based on the result detected by the first temperature detecting means, and a detecting element correcting means for correcting signals output from the detecting element based on the result detected by the second temperature detecting means.

In the inertia sensor unit equipped with the above constitution, the signal processor correcting means performs a correction of the temperature by the temperature of the signal processor detected by the first temperature correcting means, at the same time the detecting element correcting means performs a correction of the temperature by the temperature of the detecting element detected directly or indirectly by the second temperature detecting means, whereby the inertia sensor unit can accurately correct the signals output from the inertia sensor, using the temperature of the signal processor and the temperature of the detecting element, respectively.

As a result, it is possible to achieve an inertia sensor unit which is capable of correcting the temperature dependency of the signals output from the sensor and of detecting exact inertial force, irrespective of factors on thermal changes such as self-heating and external environment and the like.

An inertia sensor unit of the third aspect of the present invention is an inertia sensor unit as set forth in the first aspect of the present invention, including: a signal converting means which is connected to the signal processor, the first temperature detecting means and the second temperature detecting means and converts signals output from the signal processor, the first temperature detecting means and the second temperature detecting means into digital signals respectively, a first storing means for storing a first correction value to a temperature change of the signal processor based on the output characteristics of the signal processor, and a second storing means for storing a second correction value to a temperature change of the detecting element based on the output characteristics of the detecting element, wherein the correcting means corrects the digitized signals from signals output from the inertia sensor using the first correction value and the second correction value.

In the inertia sensor unit equipped with the above constitution, in a state of digital signals, the correcting means performs a correction of the temperature by the first correction value to the thermal change of the signal processor and the second correction value to the thermal change of the detecting element, whereby the inertia sensor unit can accurately and easily correct the signals output from the inertia sensor, using the temperature of the signal processor and the temperature of the detecting element, respectively.

As a result, it is possible to relieve the processing load of the inertia sensor, to miniaturize the inertia sensor unit and to save electric power consumption of the inertia sensor.

An inertia sensor unit of the fourth aspect of the present invention is an inertia sensor unit as set forth in the first aspect of the present invention, including a failure judging means for judging a failure of the inertia sensor based on the result detected from the first detecting means and the second detecting means.

In the inertia sensor unit equipped with the above constitution, the failure judging means performs judgement by the temperature of the signal processor detected by the first temperature detecting means and the temperature of the detecting element detected directly or indirectly by the second temperature detecting means, whereby the inertia sensor unit can accurately judge a failure of the inertia sensor. As a result, it is possible to improve the reliability of the inertia sensor unit.

DETAILED DESCRIPTION OF THE INVENTION

Hereafter, with reference to drawings, one example of the present invention will be explained.

Overall Constitution

Figure 1:
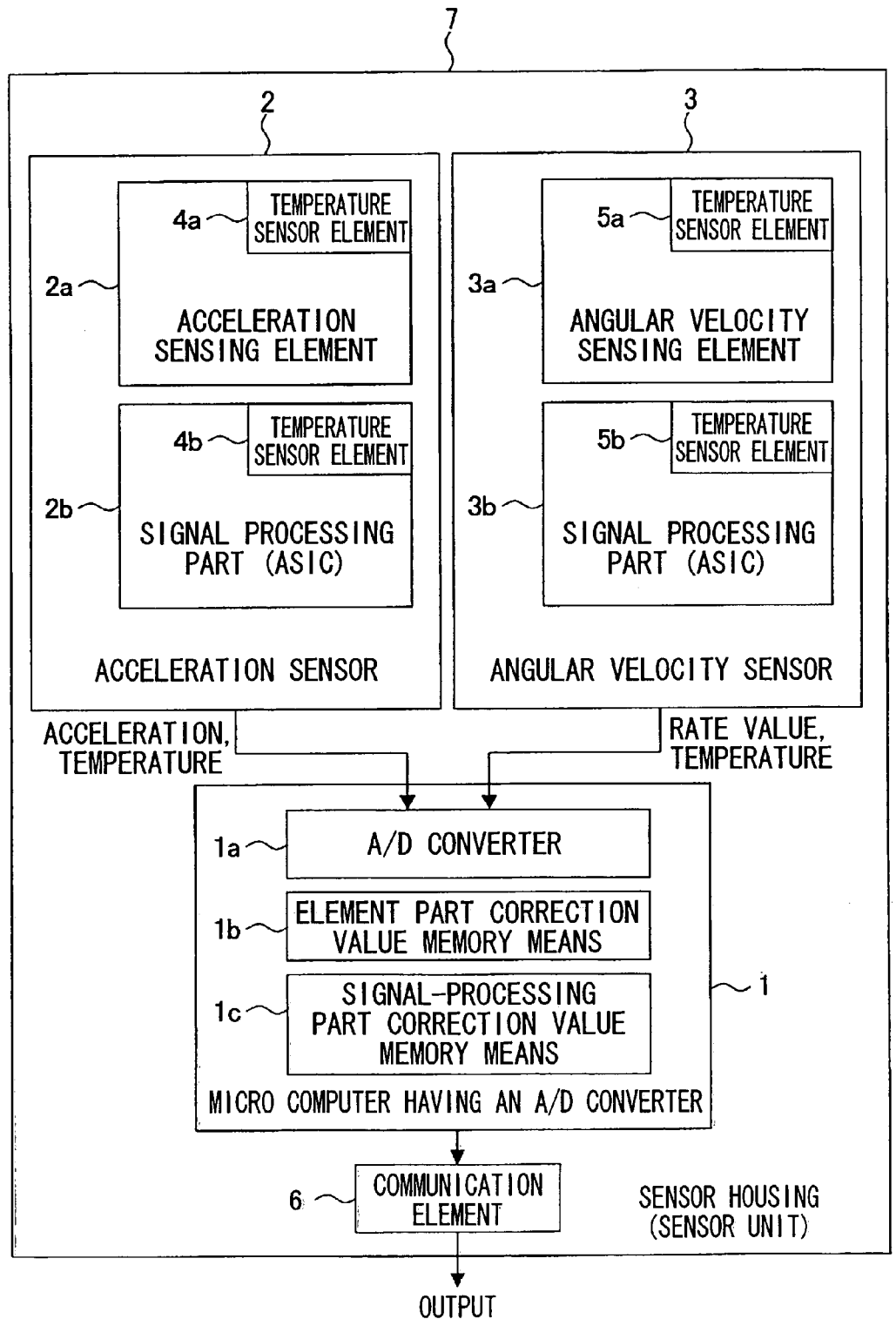
FIG. 1 is a block diagram showing the constitution of the inertia sensor unit of one example of the present invention.

FIG. 1 is a block diagram showing the constitution of the inertia sensor unit of one example of the present invention. It should be noted that the inertia sensor unit of this example of the present invention is especially useful as an inertia sensor which is installed in vehicles such as an automobile and the like, and hence it will be explained for a case-in which an inertia sensor unit is installed in an automobile.

In FIG. 1, the microcomputer 1 having an A/D converter is a control part which constitutes the center of the inertia sensor unit of the example of the present invention. The microcomputer 1 having an A/D converter is, for example, equipped with a 10-bit A/D converter 1a, in order to take analog signals which are output from various sensors arranged at appropriate locations of the automobile output into the microcomputer 1 having an A/D converter. It should be noted that, using a plurality of the A/D converters 1a, the A/D converter 1a may be equipped with each of the sensors to be connected, so as to quantize the output signal of each sensor individually. Alternatively, using one A/D converter 1a, the A/D converter 1a may quantize the output signal of each sensor by time sharing control, while changing the target sensor one by one.

Moreover, the acceleration sensor 2 and the angular velocity sensor 3 are connected to the A/D converter 1a of the microcomputer 1 having an A/D converter as various sensors arranged at appropriate locations of the automobile. Here, the acceleration sensor 2 is a sensor which detects the acceleration of the up-and-down direction, the fore-and-aft direction, and the left-and-right direction of the automobile, etc., and outputs the electric voltage value corresponding to the detected acceleration with an analog signal. On the other hand, the angular velocity sensor 3 is a sensor which detects rate values (angular velocity), such as a roll rate value, a pitch rate value, and a yawing rate value of the automobile, and outputs the electric voltage value corresponding to the detected rate value with an analog signal.

Moreover, the acceleration sensor 2 consists of an acceleration sensing element part 2a and a signal-processing part 2b by ASIC. Similarly, the angular velocity sensor 3 also consists of an angular velocity sensing element part 3a and a signal-processing part 3b by ASIC.

Here, the signal-processing part 2b or the signal-processing part 3b by ASIC prepared in each sensor is a processing part which converts by, for example, amplifying analog signals output from the acceleration sensing element part 2a or the angular velocity sensing element part 3a corresponding to the detected acceleration or rate value (angular velocity), into electric voltages which can be taken in the A/D converter 1a having an A/D converter. The processing part, i.e., the signal-processing part 2b or the signal-processing part 3b by ASIC has a memory to store correction values for correcting steady errors in signals output from each sensor and correcting functions to correct the steady errors in signals output by the correction values to output correction values.

Furthermore, each of the acceleration sensing part 2a and the signal processing part 2b, which constitutes the acceleration sensor 2, has temperature dependency. Hence, in order to correct the signal output from the acceleration senor 2 by each of the temperature of the acceleration sensing part 2a and the temperature of the signal processing part 2b, the temperature sensor elements 4a and 4b are attached to the acceleration sensing part 2a and the temperature of the signal processing part 2b, respectively. The temperature sensor elements 4a and 4b detect the temperature of the temperature of the acceleration sensing part 2a and the temperature of the signal processing part 2b, respectively, to output an electric voltage corresponding to the detected temperature, as an analog signal.

Similarly, each of the angular velocity sensing element part 3a and the signal-processing part 3b, which constitutes the angular velocity sensor 3, has temperature dependency. Hence, in order to correct the signal output from the angular velocity sensor 3 by each of the temperature of the angular velocity sensing element part 3a and the temperature of the signal processing part 3b, the temperature sensors 5a and 5b are attached to the angular velocity sensing element part 3a and the signal-processing part 3b, respectively. The temperature sensor elements 5a and 5b detect the temperature of the angular velocity sensing element part 3a and the temperature of the signal processing part 3b, respectively, to output electric voltage corresponding to the detected temperature, as an analog signal.

Therefore, to the A/D converter 1a of the microcomputer 1 having an A/D converter, the acceleration by the analog voltage value output from the acceleration sensor 2, the temperatures of the acceleration sensing element part 2a and of the signal processing part 2b by analog electric voltage values output from the temperature sensing elements 4a and 4b, respectively, attached to the acceleration sensor 2, the rate value (angular velocity) by analog electric voltage value output from the angular velocity sensor 3, and the temperatures of the angular velocity sensing element part 3a and of the signal processing part 3b by analog electric values output from the temperature sensor elements 5a and 5b, respectively, attached to the angular velocity sensor 3 are inputted. These signals are then converted into digital signals by the A/D converter 1a to be inputted in the microcomputer 1 having an A/D converter, in order to correct the signals output from each sensors having temperature dependency in the microcomputer 1 having an A/D converter.

Moreover, in order to correct the signals output from each sensor having temperature dependency, the microcomputer 1 having an A/D has both the element part correction value memory means 1b to memorize the correction value characteristic (output gap characteristic) over the temperature change of the acceleration sensing element part 2a and the correction value characteristic (output gap characteristic) over the temperature change of the angular velocity sensing element part 3a, and the signal-processing part correction value memory means 1c to store the correction value characteristic (output gap characteristic) over the temperature change of the signal-processing part 2b and the correction value characteristic (output gap characteristic) over the temperature change of the signal-processing part 3b.

By using this, through the A/D converter 1a, the microcomputer 1 having an AID converter carries out digital conversion to signals of the acceleration of the automobile detected by the acceleration sensor 2, and the rate value (acceleration) of the automobile detected by the angular velocity sensor 3 to take them in, and outputs them as control information showing the state of the automobile which can be used in each control unit of the automobile (not shown). Moreover, failure diagnosis of each sensor, etc., is performed and it is output as control information showing the state of the automobile which can be used in each control unit of the automobile (not shown). It should be noted that details of the correcting method of the signals output from each sensors and the failure-diagnosis method of a sensor with the microcomputer 1 having an A/D converter will be mentioned later.

Moreover, in addition to the above, the inertia sensor unit of the example of the present invention has the communication element (LAN transceiver) 6 for transmitting and receiving the output signals (acceleration, a rate value (angular velocity), failure-diagnosis information on a sensor, etc.) of the microcomputer 1 having an A/D converter and the control signal to the microcomputer 1 having an A/D converter through in the car [LAN], and the microcomputer 1 having an A/D converter has the controller for controlling the communication element 6 and the like.

Moreover, the microcomputer 1 having an A/D converter, the acceleration sensor 2 (the acceleration sensing element part 2a and the signal-processing part 2b), the angular velocity sensor 3 (the angular velocity sensing element part 3a and signal-processing part 3b), the temperature sensor elements 4a and 4b, the temperature sensor elements 5a and 5b, and the communication element 6 are altogether accommodated in the sensor housing 7.

Sensor Output Correcting Processing

Figure 2:
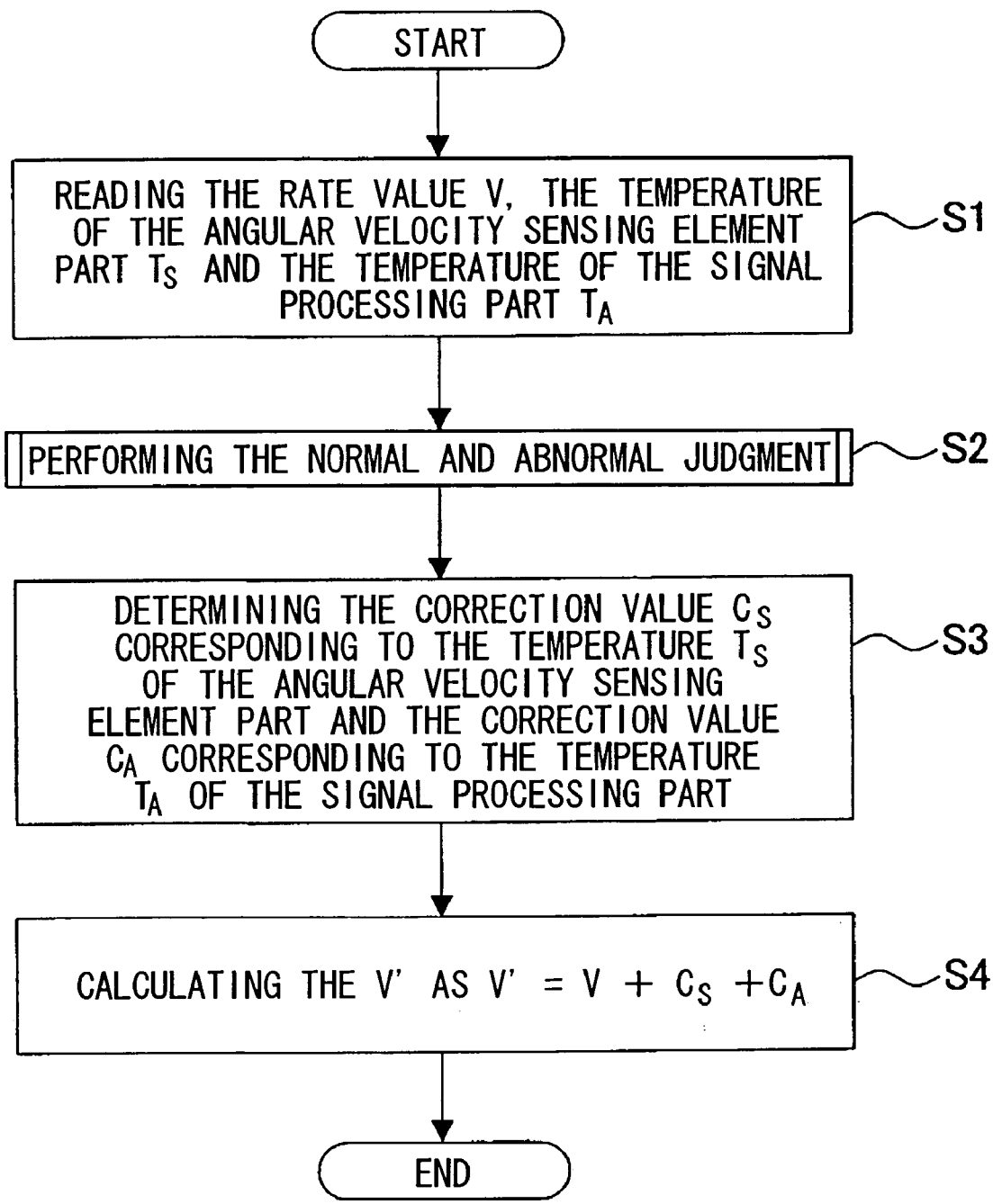
FIG. 2 is a flow chart showing sensor output correction processing operation with the microcomputer having an A/D converter of the inertia sensor unit of the example of the present invention.

Next, with reference to drawings, sensor output correcting processing operation to the temperature dependency of the inertia sensor unit of the example of the present invention will be explained. FIG. 2 is a flow chart which shows sensor output correcting processing operation with the microcomputer 1 having an A/D converter of the inertia sensor unit of the example of the present invention. It should be noted that since sensor output correcting processing operation to the acceleration sensor 2 and sensor output correcting processing operation to the angular velocity sensor 3 are the same processing operation fundamentally, and sensor output correcting processing operation with respect to the angular velocity sensor 3 will be explained in an example.

In FIG. 2, first, the microcomputer 1 having an A/D converter performs digital conversion to signals of analog electric voltage value V which shows the rate value (angular velocity) output from the signal-processing part 3b of the angular velocity sensor 3, the temperature $T_S$ of the angular velocity sensing element part 3a and the temperature $T_A$ by analog electric voltage values output from the temperature sensor elements 5a and 5b, respectively, attached in the angular velocity sensor 3, through the A/D converter 1a, to read them (Step S1).

Figure 3:
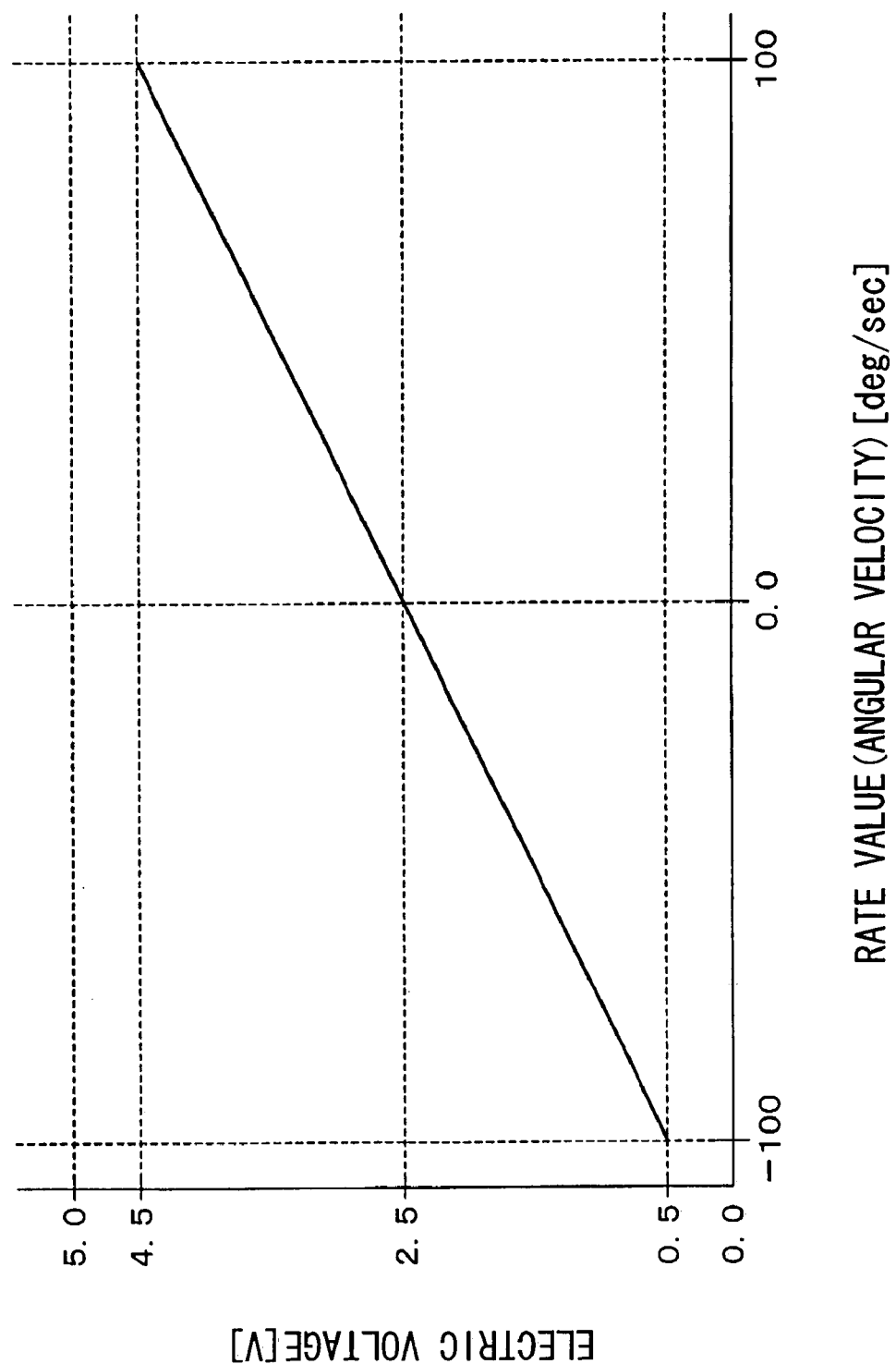
FIG. 3 is a figure showing the sensor output electric voltage characteristic of the angular velocity sensor of the inertia sensor unit of the example of the present invention.

It should be noted that FIG. 3 is a figure showing the sensor output electric voltage characteristic of the angular velocity sensor 3, and that the angular velocity sensor 3 will output the analog voltage value shown on a corresponding vertical axis, if the rate value (angular velocity) shown on a horizontal axis is detected.

Next, normal and abnormal judging processing to the angular velocity sensor 3 is performed using the rate value (angular velocity) V which is the rate value (angular velocity) being digitized and read, the temperature $T_S$ of the angular velocity sensing element part 3a, and the temperature $T_A$ of the signal-processing part 3b (Step S2).

Details of the Normal and Abnormal Judging Processing will be given Later.

On the other hand, when it is judged that the angular velocity sensor 3 is normal in Step S2, the microcomputer 1 having an A/D converter determines the correction value $C_S$ corresponding to the temperature $T_S$ of the detected angular velocity sensing element part 3a from the correction value characteristic (output gap characteristic) over the temperature change of the angular velocity sensing element part 3a beforehand memorized by the microcomputer 1 having an A/D converter based on the output characteristic of the angular velocity sensing element part 3a. Moreover, the correction value $C_A$ corresponding to the temperature $T_A$ of the detected signal-processing part 3b is determined from the correction value characteristic (output gap characteristic) over the temperature change of the signal-processing part 3b similarly stored beforehand by the microcomputer 1 having an A/D converter based on the output characteristic of the signal-processing part 3b (Step S3).

Figure 4:
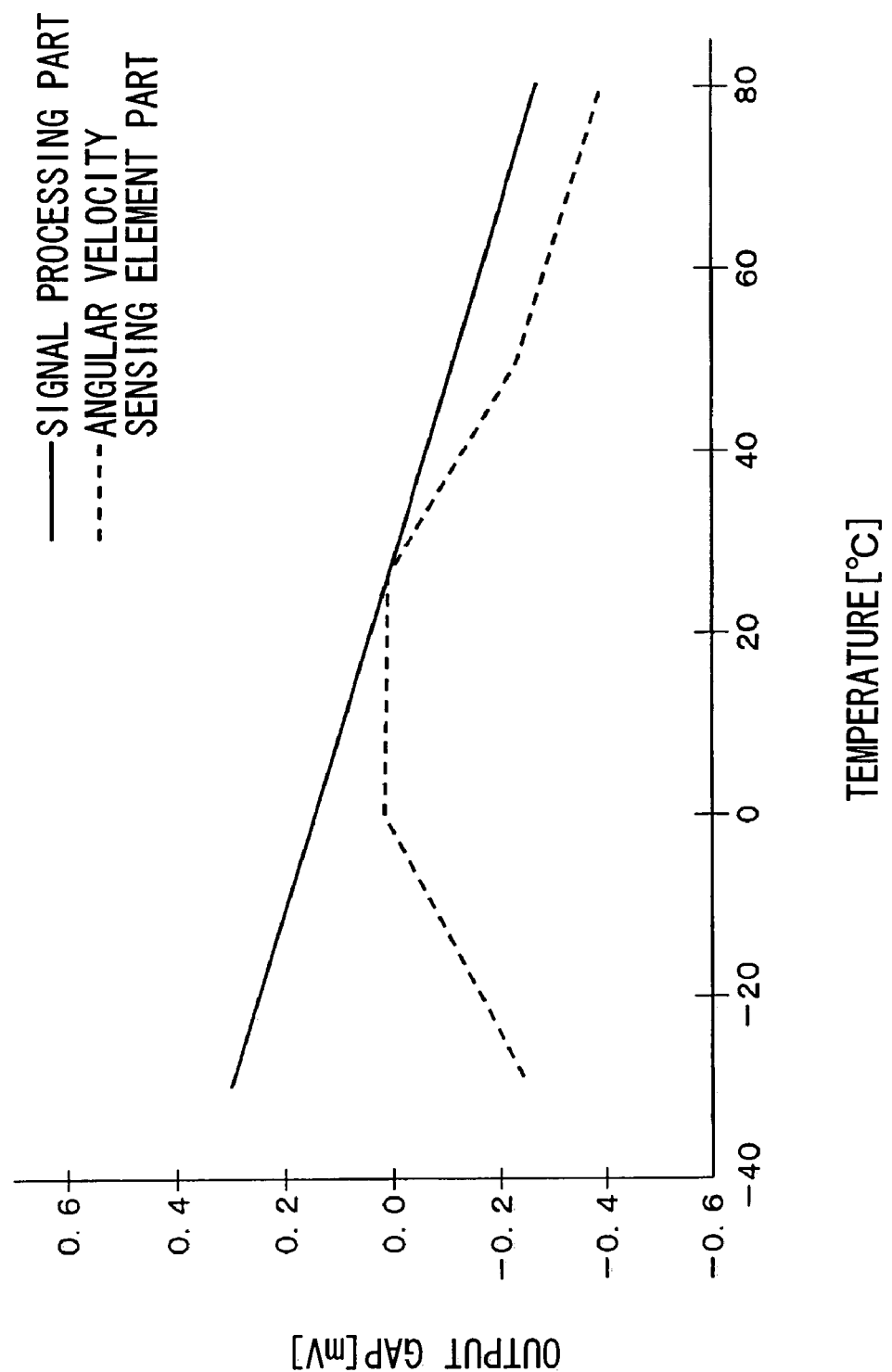
FIG. 4 is a control map which is used when the microcomputer having an A/D converter of the inertia sensor unit of the example of the present invention performs sensor output correction processing.

Concretely, FIG. 4 is a control map, in which the horizontal axis is shown as the temperature $T_S$ of the angular velocity sensing element part 3a, or the temperature $T_A$ of the signal-processing part 3b, meanwhile the vertical axis is shown as the correction value over the temperature change of the angular velocity sensing element part 3a, or a correction value over the temperature change of the signal-processing part 3b. This control map is stored beforehand in each of the element part correction value memory means 1b and the signal-processing part correction value memory means 1c in the microcomputer 1 having an A/D converter, Furthermore, the microcomputer 1 having an A/D converter determines the correction value $C_S$ corresponding to the temperature $T_S$ of the detected angular velocity sensing element part 3a, and the correction value $C_A$ corresponding to the temperature $T_A$ of the detected signal-processing part 3b based on this control map.

Moreover, if the correction value $C_A$ and the correction value $C_S$ are determined, the microcomputer 1 having an A/D converter will correct the rate value (angular velocity) V which is digitized and read using the correction value $C_A$ and the correction value $C_S$. Concretely, V' after correcting is calculated based on the following formula (1) (Step S4).

$$V'=V+CS+CA \qquad (1)$$

Furthermore, the microcomputer 1 having an A/D converter ends the sensor output correcting processing operation.

It should be noted that as for the acceleration sensor 2, the signals output from the acceleration sensor 2 can be corrected by the temperature of the acceleration sensing element part 2a and the temperature of the signal processing part 2b, respectively, by storing the control map, in which the horizontal axis is shown as the temperature of the acceleration sensing element part 2a or the temperature of the signal processing part 2b, meanwhile the vertical axis is shown as the correction value over the temperature change of the acceleration sensing element part 2a or a correction value over the temperature change of the signal-processing part 2b, respectively, in the element part correction value memory means 1b and the signal-processing part correction value memory means 1c of the microcomputer 1 having an A/D converter, and performing the process composed of the similar steps by the microcomputer having an A/D converter.

Normal and Unusual Judging Processing

Figure 5:
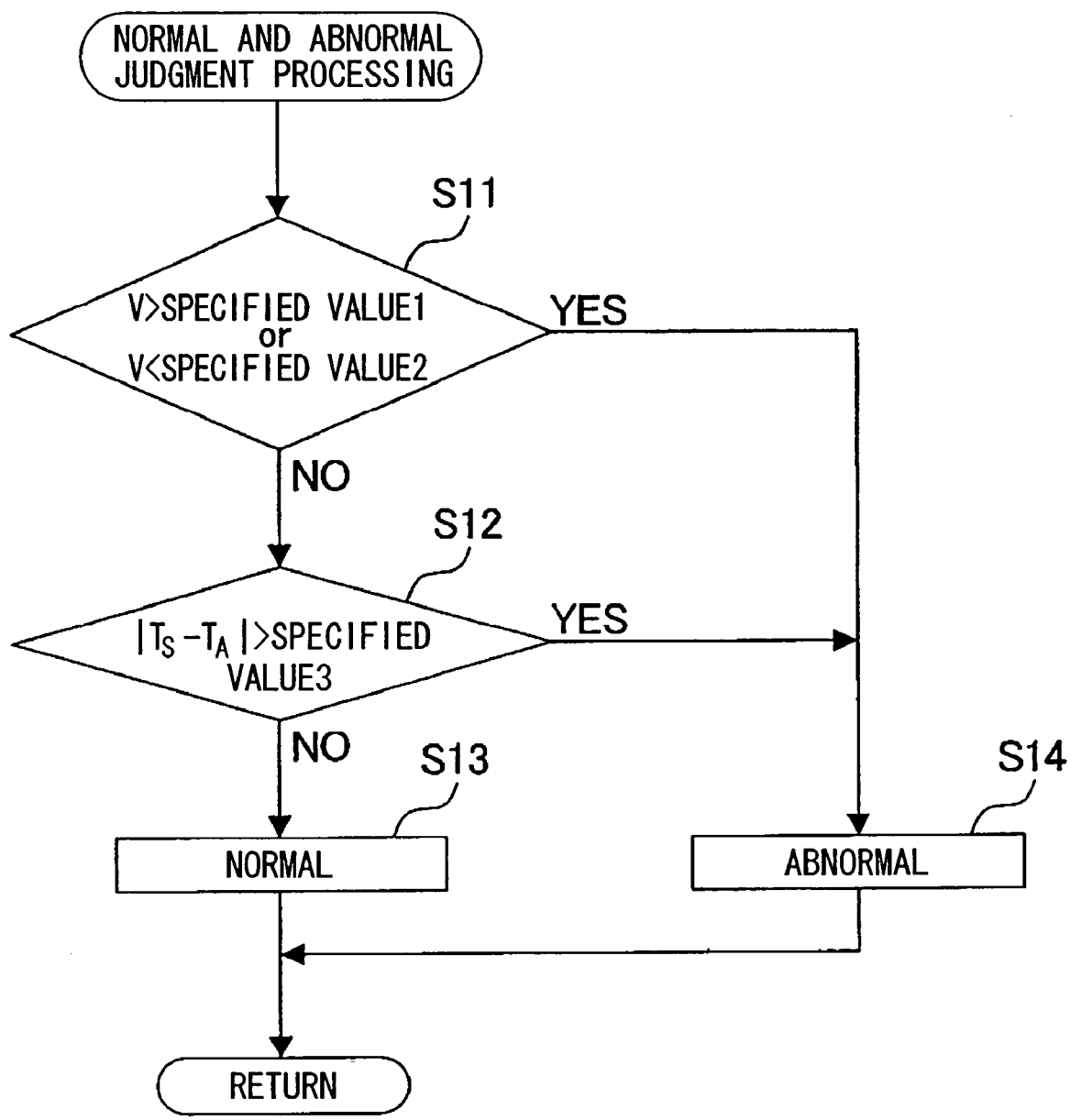
FIG. 5 is a flow chart showing normal and abnormal judging processing operation of a sensor with the microcomputer having an A/D converter of the inertia sensor unit of the example of the present invention.

Next, with reference to drawings of normal and abnormal judging processing operation of the sensor performed at Step S2 of sensor output correcting processing operation of the inertia sensor unit of this example of the present invention will be explained. FIG. 5 is a flow chart which shows normal and abnormal judging processing operation of a sensor with the microcomputer 1 having an AID converter of the inertia sensor unit of this example of the present invention.

In FIG. 5, as a first the microcomputer 1 having an A/D converter judges whether the rate value (angular velocity) V, which is digitized and read in Step S1 of sensor output correcting processing operation, is larger than the specified value 1 (for example, as for the specified value 1, let the specified value be 1=4.5 [V] from the output characteristic of the angular velocity sensor 3.) or not, alternatively, whether the rate value (angular velocity) is smaller than the specified value 2 (for example, as for the specified value 2, let the specified value be 2=0.5 [V] from the output characteristic of the angular velocity sensor 3.) or not.(Step. 11).

If in Step S11, the rate value (angular velocity) is less than the specified value 1 and the rate value (angular velocity) is larger than the specified value 2 ("NO" of Step S11), then the microcomputer 1 having an A/D converter judges, as to the temperature Ts of the angular velocity sensing element part 3a and the temperature $T_A$ of the signal processing part 3b being digitized and read in Step S1 of the sensor output correcting processing operation, for example an absolute value of the difference obtained by subtracting the temperature $T_A$ of the signal processing part 3b from the temperature $T_S$ of the angular velocity sensing element part 3a, that is, whether an absolute value of the temperature difference between the temperature $T_A$ of the signal processing part 3b and the temperature $T_S$ of the angular velocity sensing element part 3a, i.e., ($|T_S-T_A|$) is larger than the specified value 3 (for example, as to the specified value 3, let the specified value be 3=10 [° C.] from the element characteristic of the angular velocity sensing element part 3a and the signal-processing part 3b.) or not.(Step S12).

In Step S12, when the absolute value ($|T_S-T_A|$) of a temperature difference between the temperature $T_S$ of the angular velocity sensing element part 3a and the temperature $T_A$ of the signal-processing part 3b is not more than the specified value 3 ("NO" of Step S12), the microcomputer 1 having an A/D converter judges the angular velocity sensor 3 "is normal" (Step S13).

On the other hand, in Step S11, when the rate value (angular velocity) V is larger than the specified value 1, or the rate value (angular velocity) V is less than 2 ("YES" of Step S11), the microcomputer 1 having an A/D converter judges that the angular velocity sensor 3 is "abnormal" (Step S14). Moreover, in Step S12, when the absolute value temperature difference between the temperature $T_S$ of the angular velocity sensing element part 3a and the temperature $T_A$ of the signal-processing part 3b, i.e., ($|T_S-T_A|$) is larger than the specified value 3 (YES of Step S12), the microcomputer 1 having an A/D converter similarly judges that the angular velocity sensor 3 is "abnormal" (Step S14).

Furthermore, the microcomputer 1 having an A/D converter ends normal and abnormal judging processing operation, and returns to sensor output correcting processing operation. It should be noted that the specified value over acceleration and the specified value over the absolute value of a temperature difference between the temperature of the acceleration sensing element part 2a and the temperature of the signal-processing part 2b can be beforehand defined also about the acceleration sensor 2, and normal and abnormal judging processing of the acceleration sensor 2 can be performed by performing processing of the same procedure with the microcomputer 1 having an A/D converter.

It should be noted that although in the above example, the sensor output correcting processing operation to the temperature dependency, and normal and abnormal judging processing operation for the acceleration sensor 2 and the angular velocity sensor 3 are explained, as to a sensor having temperature dependency, the sensor output correcting processing and the normal and abnormal judging processing of a sensor can be performed similarly altogether.

Moreover, in the above example, the microcomputer 1 having an A/D converter includes the signal-processing part correcting means, the detection element part correcting means, and the failure judging means. More concretely, the processings of Step S3 and Step S4 in FIG. 2 correspond to the signal-processing part correcting means and the detection element part correcting means, respectively, and, the processing of Step S2 in FIG. 2 and Step S11 to the step S14 in FIG. 5 corresponds to the failure judging means. Another form of the temperature sensor attachment position in overall constitution.

As mentioned above, in the block diagram showing the constitution of the inertia sensor unit of this example shown in FIG. 1, in addition to the signal-processing part 2b and the signal-processing part 3b, a temperature sensor element is attached also to each of the acceleration sensing element 2a and the angular velocity sensing element 3a. For example, while determining the correction value corresponding to the temperature of the detected angular velocity sensing element part 3a from the correction value characteristic (output gap characteristic) over the temperature change of the angular velocity sensing element part 3a, the correction value corresponding to the temperature of the detected signal processing part is determined similarly from the correction value characteristic (output gap characteristic) over the temperature change of the signal processing part 3b, so that the rate value (angular velocity) V is determined using above two correction values.

However, if the temperature sensor element is attached to each of acceleration sensor element and angular velocity sensor element, then the number of temperature sensor elements may increase and the cost of an inertia sensor unit may increase unexpectedly, when the numbers of acceleration sensor or of angular sensor increase. Therefore, the attachment position of a temperature sensor element may be changed as follows, so that the number of temperature sensor elements may not increase.

Figure 6:
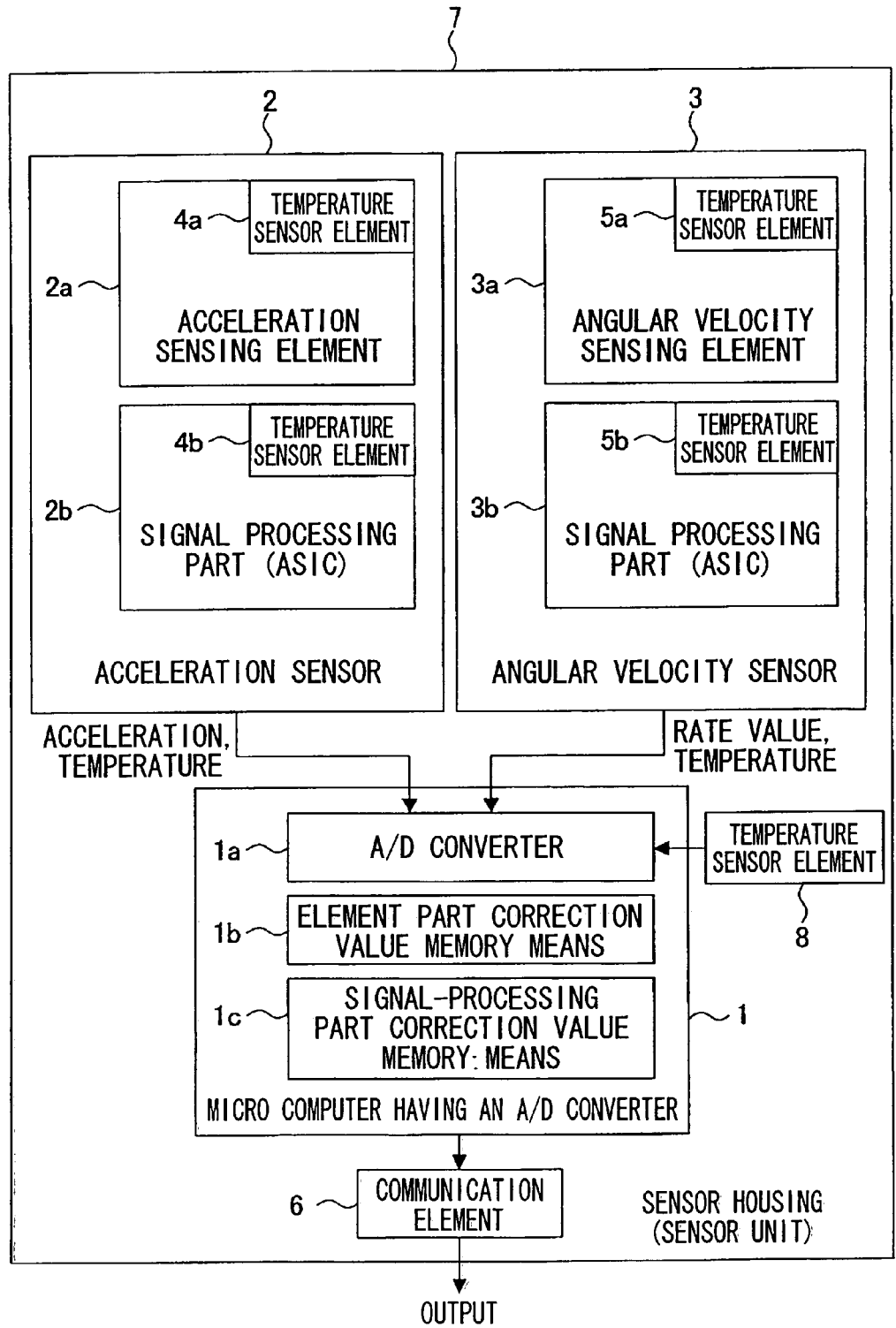
FIG. 6 is a block diagram showing another form of the temperature sensor attachment position of the inertia sensor unit of the example of the present invention.

Concretely, unlike the signal-processing part 2b and the signal-processing part 3b of which temperature increase by self-generation of heat, since the acceleration sensing element 2a and the angular velocity sensing element 3a have little self-generation of heat, the temperatures thereof are influenced by environmental temperature thereof, respectively (determined at an ambient temperature). Therefore, as shown in the block diagram in FIG. 6, the temperature sensor element 8 which detects the temperature within the sensor housing 7 may be attached instead of the temperature sensor element 4a attached to the acceleration sensing element 2a and the temperature sensing element Sa attached to the angular velocity sensing element 3a, so that the temperature in the sensor housing 7 by analog electric voltage output from the temperature sensor element 8 is inputted into the microcomputer 1 having an A/D converter through the A/D converter. That is, the microcomputer 1 having an A/D converter acquires the temperature of the acceleration sensing element 2a or the angular velocity sensing element 3a as a temperature in the sensor housing 7, so as to perform above-mentioned sensor output correcting processing, and normal and abnormal judging processing of the sensor.

As explained above, in the inertia sensor unit of this example of the present invention, a temperature sensor element is attached to each of the signal-processing part 2b, the signal-processing part 3b, the acceleration sensing element 2a and the angular velocity sensing element 3a, whereby the correction value corresponding to the detected temperature of the angular velocity sensing element part 3a is determined, and simultaneously, the correction value corresponding to the temperature detected similarly of the signal processing part 3b is determined, so that the rate value (angular velocity) V which is digitized and read is corrected using the above two correction values. As to the acceleration sensor 2, by performing similar processing, the acceleration which is digitized and read is corrected using the two correction values calculated. As a result, the inertia sensor unit of the present invention can perform the normal and abnormal judging processing of the acceleration sensor 2 and the angular sensor 3, from the rate value, the temperature, the acceleration and the temperature which is read.

Furthermore, even if no temperature sensor elements are attached to the acceleration sensing element 2a and to the angular velocity sensing element 3a, instead of the temperature sensor elements 4a and 5a attached to the acceleration sensing element 2a and the angular velocity sensing element 3a, respectively, by attaching the temperature sensor element 8 which detects the temperature in the sensor housing 7, the microcomputer 1 having an A/D converter can take the temperatures of the acceleration sensing element 2a and of the angular velocity sensing element 3a as the temperature in the housing 7, and the microcomputer 1 having an A/D converter can take the temperatures of the signal processing parts 2b and 3b by the temperature sensor elements 4b and 5b, respectively, so that the inertia sensor unit of the present invention can perform the normal and abnormal judging processing of the above sensors.

Therefore, the inertia sensor unit which is capable of correcting the temperature dependency of the output of the acceleration sensor 2 and the angular velocity sensor 3 with sufficient accuracy, and of detecting exact acceleration and a rate value (angular velocity) can be provided. Moreover, since the output of the acceleration sensor 2 and the angular velocity sensor 3 can be accurately corrected at each temperature of the signal-processing part 2b, the signal-processing part 3b, the acceleration sensing element 2a, and the angular velocity sensing element 3a, the inertia sensor unit which is capable of correcting the temperature dependency of the output of the sensor and of detecting an inertia force accurately, regardless of the factor of a temperature change such as self-generation of heat, outside environment, etc., can be provided.

Moreover, since the output of the acceleration sensor 2 and the angular velocity sensor 3 can be accurately corrected in the state of a digital signal at each temperature of the signal-processing part 2b, the signal-processing part 3b, the acceleration sensing element 2a, and the angular velocity sensing element 3a, the processing load of the inertia sensor unit can be decreased and the miniaturization of the inertia sensor unit and lowering of power consumption can be achieved.

Moreover, since failure of the acceleration sensor 2 and the angular velocity sensor 3 can be accurately judged by performing normal and abnormal judging processing of a sensor, and hence the reliability of the inertia sensor unit can be improved.

As mentioned above, although the preferred embodiment of the present invention was explained, this invention is not limited to the embodiment. It is the range which does not deviate from the meaning of this invention, and addition of constitution, an abbreviation, substitution, and other change are possible. This invention is not limited by the explanation mentioned above and is limited by only the scope of the attached claims.

What is claimed is:

1. An inertia sensor unit having a detecting element, and a signal processor being constituted as an element separate from said detecting element, for at least amplifying signals output from said detecting element, said inertia sensor mounted to a detection object for detecting acceleration or angular velocity of said detection object as an inertial force of said detection object to output electrical signals changing according to said inertial force, comprising:

a first temperature detecting means attached to said signal processor for detecting the temperature of said signal processor, a second temperature detecting means attached to said detecting element for detecting the temperature of said detecting element, and a correcting means for correcting the signals output from said inertia sensor based on the result detected by said first temperature detecting means and said second temperature detecting means.

2. An inertia sensor unit as set forth in claim 1, wherein said correcting means comprises:

a signal processor correcting means for correcting signals output from said signal processor based on the result detected by said first temperature detecting means, and a detecting element correcting means for correcting signals output from said detecting element based on the result detected by said second temperature detecting means.

3. An inertia sensor unit as set forth in claim 1, comprising:

a signal converting means which is connected to said signal processor, said first temperature detecting means and said second temperature detecting means and converts signals output from said signal processor, said first temperature detecting means and said second temperature detecting means into digital signals respectively, a first storing means for storing a first correction value to a temperature change of said signal processor based on the output characteristics of said signal processor, and a second storing means for storing a second correction value to a temperature change of said detecting element based on the output characteristics of said detecting element, wherein said correcting means corrects the digitized signals from signals output from said inertia sensor using said first correction value and said second correction value.

4. An inertia sensor unit as set forth in claim 1, comprising a failure judging means for judging a failure of said inertia sensor based on the result detected from said first detecting means and said second detecting means.

* * * * *